(12) United States Patent
Kato et al.

(10) Patent No.: US 7,214,429 B2
(45) Date of Patent: May 8, 2007

(54) SEALING MATERIAL

(75) Inventors: Masahiro Kato, Mobara (JP); Junichiro Kogure, Mobara (JP)

(73) Assignee: Futaba Corporation, Mobara-shi, Chiba-ken (JP)

(*) Notice: Subject to any disclaimer, the term of this patent is extended or adjusted under 35 U.S.C. 154(b) by 296 days.

(21) Appl. No.: 10/673,939

(22) Filed: Sep. 29, 2003

(65) Prior Publication Data

US 2004/0071925 A1 Apr. 15, 2004

(51) Int. Cl.
*B32B 18/00* (2006.01)
*B32B 17/00* (2006.01)
*C03C 8/22* (2006.01)
*C03C 8/16* (2006.01)
*C03C 8/08* (2006.01)

(52) U.S. Cl. .................. 428/406; 428/404; 501/17; 501/20; 501/24

(58) Field of Classification Search ............ 501/14–25, 501/45; 428/404–406
See application file for complete search history.

(56) References Cited

U.S. PATENT DOCUMENTS

| | | | | |
|---|---|---|---|---|
| 4,215,020 A * | 7/1980 | Wahlers et al. | ........ | 252/519.54 |
| 4,314,031 A * | 2/1982 | Sanford et al. | ................ | 501/44 |
| 4,340,508 A * | 7/1982 | Wahlers et al. | .......... | 252/520.1 |
| 4,871,693 A * | 10/1989 | Inoue et al. | .................... | 501/9 |
| 5,246,890 A * | 9/1993 | Aitken et al. | ................. | 501/15 |
| 5,281,560 A * | 1/1994 | Francis et al. | ................. | 501/15 |
| 5,510,301 A * | 4/1996 | Fink et al. | .................... | 501/20 |
| 5,514,629 A * | 5/1996 | Morena | ....................... | 501/15 |
| 5,516,733 A * | 5/1996 | Morena | ....................... | 501/15 |
| 6,048,811 A * | 4/2000 | Morena | ....................... | 501/15 |
| 6,069,099 A * | 5/2000 | Fewkes et al. | ................. | 501/15 |
| 6,306,783 B1 * | 10/2001 | Yamanaka | ................... | 501/15 |
| 6,309,989 B1 * | 10/2001 | Kikutani | ...................... | 501/15 |
| 6,355,586 B1 * | 3/2002 | Usui et al. | .................... | 501/45 |
| 6,617,269 B2 * | 9/2003 | Yamanaka | ................... | 501/24 |
| 6,737,375 B2 * | 5/2004 | Buhrmaster et al. | .......... | 501/47 |
| 6,809,049 B2 * | 10/2004 | Hirose | ........................ | 501/24 |
| 6,844,278 B2 * | 1/2005 | Wang et al. | .................. | 501/32 |
| 6,989,340 B2 * | 1/2006 | Masuda | ....................... | 501/45 |
| 6,998,776 B2 * | 2/2006 | Aitken et al. | ............... | 313/512 |
| 2002/0019303 A1 * | 2/2002 | Yamanaka | ................... | 501/17 |
| 2002/0128141 A1 * | 9/2002 | Buhrmaster et al. | .......... | 501/45 |

FOREIGN PATENT DOCUMENTS

| | | |
|---|---|---|
| JP | 05-132339 | 5/1993 |
| JP | 08-239239 | 9/1996 |
| JP | 11-283537 | 10/1999 |
| JP | 2000-072749 | 3/2000 |
| JP | 2002020319 | 1/2002 |

* cited by examiner

*Primary Examiner*—J. A. Lorengo
*Assistant Examiner*—Elizabeth A. Bolden
(74) *Attorney, Agent, or Firm*—Quarles & Brady LLP

(57) ABSTRACT

A sealing material for sealing an envelope of an electron tube. The sealing material comprises 0.01~2.0 wt % of fine particle selected from the group consisting of $SiO_2$, $Al_2O_3$ and $ZrO_2$ having a particle diameter of 0.001~0.1 μm, $P_2O_5$—SnO type low melting glass and thermal expansion-controlling low melting ceramics.

3 Claims, 5 Drawing Sheets

SEALING MATERIAL

CROSS REFERENCES TO RELATED APPLICATIONS

This application claims priority to Japanese Patent Application No. 2002-284628 filed on Sep. 30, 2002.

STATEMENT REGARDING FEDERALLY SPONSORED RESEARCH

Not Applicable

BACKGROUND OF THE INVENTION

1. Field of the Invention

The present invention relates to a sealing material for sealing an envelope of an electron tube using $P_2O_5$—SnO type low melting glass powder, and a method of preparing the sealing material for sealing an envelope of an electron tube, as well as, to an electron tube having an envelope sealed with the sealing material.

2. Description of the Related Art

FIG. 8 is a diagrammatic view showing a general structure of a vacuum fluorescent display, as an example of the electron tube, having an envelope sealed by a sealing material. The vacuum fluorescent display 1 shown in FIG. 8 generally includes the envelope which is maintained in high vacuum. The envelope is formed of a glass substrate 2 on which an anode electrode and a grid electrode are formed, a spacer glass plates 5, and a front panel 6 bonded together with an amorphous low melting glass 7 as a sealing material for sealing the vacuum fluorescent display. The envelope further includes an anchor for supporting a filament and various metal parts, such as, a filament lead 3 for taking the filament out of the envelope and a lead 4 for taking the anode electrode and grid electrode out of the envelope to be bonded between the upper surface of the glass substrate 2 and the spacer glass plates 5 with the amorphous low melting glass 7.

The amorphous low melting glass 7 used in the vacuum fluorescent display is a paste-like sealing material prepared by kneading a mixture of PbO—$B_2O_3$—$SiO_2$ type low melting powder and thermal expansion controlling ceramics $PbTiO_3$ with a vehicle prepared by dissolving a binder, such as, 1~5% ethyl cellulose in a solvent, such as, terpineol.

The amorphous low melting glass 7 as a sealing material is formed in a predetermined pattern on the upper surface of the glass substrate 2 in advance by means of a screen printing method, and then subjected to a baking step in which temperature is raised to about 400~500° C., maintained at that temperature, and then lowered to ordinary temperature to be vitrified to form the seal pattern 8.

The seal pattern 8 is heated again to about 400~500° C. at assembly steps of the envelope to bond and hermetically seal the glass substrate 2 to the spacer glass plates 5 and then the temperature is lowered to ordinary temperature. As a result, the seal pattern 8 is made to be amorphous glass, and the hermetic sealing can be maintained.

In recent years, in order to minimize adverse effects on environment, it has been proposed to use numerous lead-free low melting glass powders including various phosphoric acid type low melting glass powders instead of the PbO—$B_2O_3$—$SiO_2$ type low melting glass powder containing Pb which is hazardous to environment. For example, these glass powders are disclosed in Unexamined Japanese Patent Publications No. 5-132339 and No. 8-239239.

A sealing material comprising $P_2O_5$—SnO type low melting glass powders as a phosphoric acid-type low melting glass powders is disclosed in, for example, Unexamined Japanese Patent Publication No. 11-283537. A paste-like sealing material prepared by kneading the $P_2O_5$—SnO type low melting glass powders with a vehicle is disclosed in, for example Unexamined Japanese Patent Publication No. 2000-72749. Further, a paste-like sealing material prepared by kneading the $P_2O_5$—ZnO—SnO type low melting glass powders with a vehicle, such as, nitrocellulose, used for preparing a good hermetically sealed envelope by providing a temperature profile maintaining 200~250° C. for ten (10) minutes is disclosed in, for example, Unexamined Japanese Patent Publication No. 2002-20319.

In accordance with the teachings of prior art, inventors prepared a paste-like sealing material by kneading 80 wt % of phosphoric acid type lead-free glass (powder glass of $P_2O_5$—SnO type low melting glass having the softening point of about 300~400° C.) with 20 wt % of vehicle prepared by dissolving 3~5 wt % of binder, such as, ethyl cellulose in a solvent, such as, alcohol. The paste-like sealing material thus obtained is formed in the seal pattern 8 similarly to prior art and then maintained at temperatures of 400~500° C. for a given time to form vitrified paste-like sealing material. The temperature is then raised again to, and maintained at, 400~500° C. to melt the vitrified sealing material again, thereby hermetically sealing the glass substrate 2 and the spacer glass plates 5. However, it is noted that the mechanical strength of the sealing material at the sealing area is not sufficient.

In order to confirm and pursue the cause of the insufficient mechanical strength of the phosphoric acid-type lead-free glass (powder glass of $P_2O_5$—SnO type low melting glass having the softening point of about 300~400° C.,) the inventors prepared the sealing material comprising PbO—$B_2O_3$—SiO type low melting glass powder having sufficient mechanical strength which is subjected to bake at a temperature of 400~500° C. to form amorphous low melting glass. FIG. 1 shows an ×200 magnification micrograph of the surface of the amorphous low melting glass thus obtained.

As shown in the micrograph of FIG. 1, the amorphous low melting glass prepared by baking the sealing material comprising $P_2O_5$—$B_2O_3$—SnO type low melting glass powder at the temperature of 400~500° C. includes non-vitrified surface of the amorphous low melting glass in part shown in the region (A) because of deposition of devitrified substances. However, a larger part of the surface of the amorphous low melting glass is vitrified as shown in the region (B).

On the other hand, the inventors prepared a sealing material comprising $P_2O_5$—SnO type low melting glass powder which is subjected to bake at a temperature of 400~500° C. to form amorphous low melting glass. FIG. 2 shows an ×200 magnification micrograph of the surface of the amorphous low melting glass thus obtained.

As shown in the micrograph of FIG. 2, the amorphous low melting glass prepared by baking the sealing material comprising $P_2O_5$—SnO type low melting glass powder at the temperature of 400~500° C. includes non-vitrified surface of the amorphous low melting glass on the whole region shown in the region (A) because of the crystallization of devitrified substances.

FIG. 5 shows relative content of substances present on the surface of the amorphous low melting glass prepared by baking the sealing material comprising $P_2O_5$—SnO type low melting glass powder at the temperature of 400~500° C. shown in the micrograph of FIG. 2.

As shown in the graph of FIG. 5, each of SnO component which contributes to low melting point and $P_2O_5$ component constituting network structure on the surface of the seal pattern 8 using the conventional sealing material of $P_2O_5$—SnO type low melting glass powder decreases by about 50% or more as compared with those on the surface of the amorphous glass out of which devitrified substances are not crystallized.

Judging from the foregoing analysis, it is conceived that the weak mechanical strength of the sealing area of the conventional sealing material of $P_2O_5$—SnO type low melting glass powder is due to the crystallization of devitrified substance on the surface of the sealing material. Also, the weak mechanical strength of the sealing area of the amorphous glass prepared by baking the conventional sealing material of $P_2O_5$—SnO type low melting glass powder and thermal expansion-controlling ceramics at the temperature of 400~500° C. is due to insufficient vitrification of the $P_2O_5$—SnO type low melting glass powder after baking at the temperature of 400~500° C.

The reason why the $P_2O_5$ type low melting glass powder is not sufficiently vitrified is that SnO which contributes to low melting point as a network modifying agent penetrates partly the network structure of $P_2O_5$ and is crystallized in a state of glass having a stable structure intact at the time of baking the sealing material of $P_2O_5$ type low melting glass as a network molecule of glass at the temperature of 400~500° C. As a result, devitrification occurs.

SUMMARY OF THE INVENTION

The present invention has been made in order to solve such problems as described above. Accordingly, an object of the present invention is to provide a sealing material for sealing an envelope of an electron tube using $P_2O_5$—SnO type low melting glass powder having sufficient sealing strength without lead having adverse effect on environment, and a method of preparing the sealing material, as well as an electron tube having an envelope sealed with the sealing material.

In order to achieve the foregoing object, the inventors have noticed that addition of insulating oxide fine particles to $P_2O_5$—SnO type low melting glass powder can prevent the instability resulting from devitrification of $P_2O_5$—SnO type low melting glass powder, thereby improving the sealing strength of the sealing material.

Therefore, according to the first aspect of the present invention, there is provided a sealing material for sealing an envelope of an electron tube comprising $P_2O_5$—SnO type low melting glass powder, thermal expansion-controlling ceramics having low expansion coefficient and insulating oxide fine particles having a particle diameter of 0.001~0.1 μm. In the first aspect of the present invention, the insulating oxide fine particles are substantially uniformly distributed on the surface of the $P_2O_5$—SnO type low melting glass powder. The insulating oxide fine particles are $SiO_2$ fine particles and present in 0.01~2 wt % to the total weight of the $P_2O_5$—SnO type low melting glass powder and the thermal expansion-controlling ceramics.

According to the second aspect of the present invention, there is provided a method of preparing a sealing material for sealing an envelope of an electron tube comprising the steps of distributing substantially uniformly insulating oxide fine particles having a particle diameter of 0.001~0.1 μm in a vehicle, putting $P_2O_5$—SnO type low melting glass powder and thermal expansion-controlling ceramics having low expansion coefficient into the vehicle, and kneading uniformly a mixture of the insulating oxide fine particles, $P_2O_5$—SnO type low melting glass powder and thermal expansion-controlling ceramics having low expansion coefficient.

According to the third aspect of the present invention, there is provided an electron tube having an anode coated with a phosphor layer and a cathode as an electron source which are mounted inside an envelope sealed with a sealing material and maintained in high vacuum, which emits light by bombarding an electron emitted from the cathode to the anode on which the phosphor layer is deposited. The sealing material comprises 0.01~2 wt % of insulating oxide fine particles having a particle diameter of 0.001~0.1 μm on the total weight of $P_2O_5$—SnO type low melting glass powder and thermal expansion-controlling ceramics.

BRIEF DESCRIPTION OF THE DRAWINGS

A more complete understanding of the present invention will be made with reference to the following detailed explanations which are given in connection with the accompanying drawings, in which.

DETAILED DESCRIPTION OF THE PREFERRED EMBODIMENT

Figure 1:
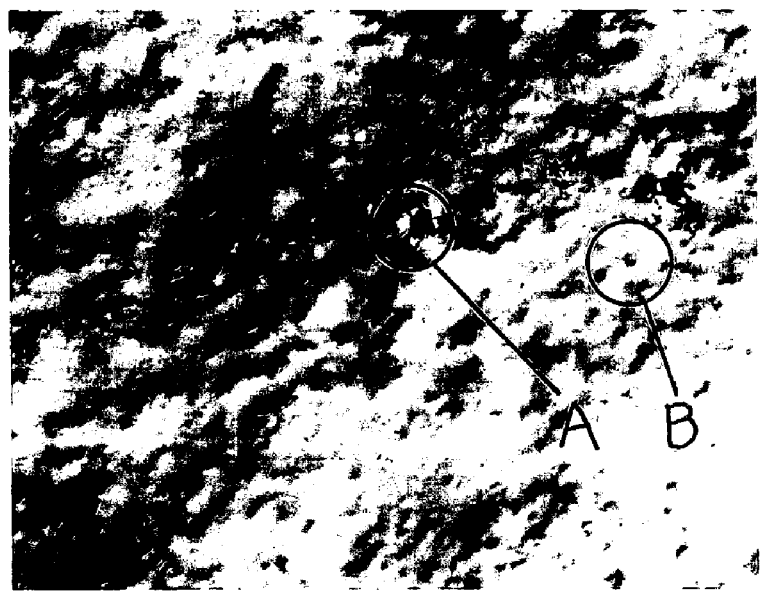
FIG. 1 is a 200× magnification micrograph showing the surface of amorphous low melting glass using a conventional sealing material comprising a main component of PbO—$B_2O_3$—$SiO_2$ type low melting glass powder and 3.0 wt % of ethyl cellulose.
Figure 2:
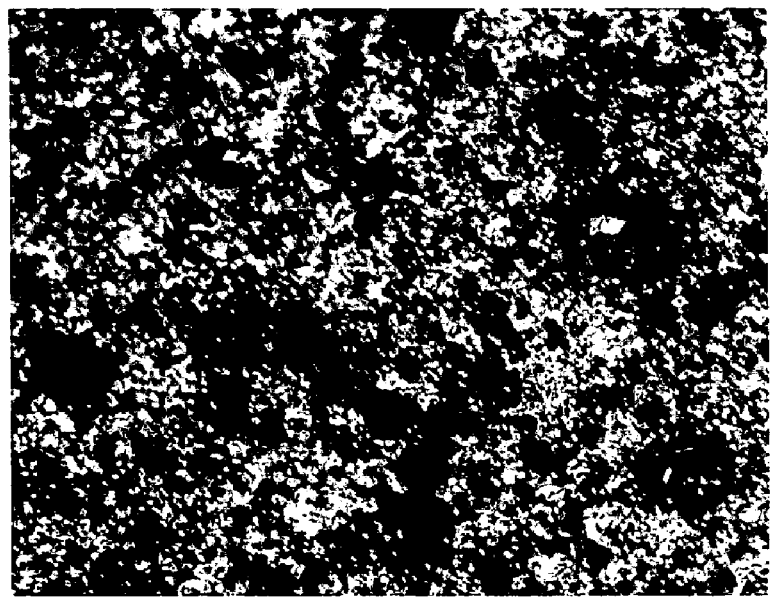
FIG. 2 is a 200× magnification micrograph showing the surface of amorphous low melting glass using a conventional sealing material comprising a main component of $P_2O_5$—SnO type low melting glass powder and 3.0 wt % of ethyl cellulose.
Figure 3:
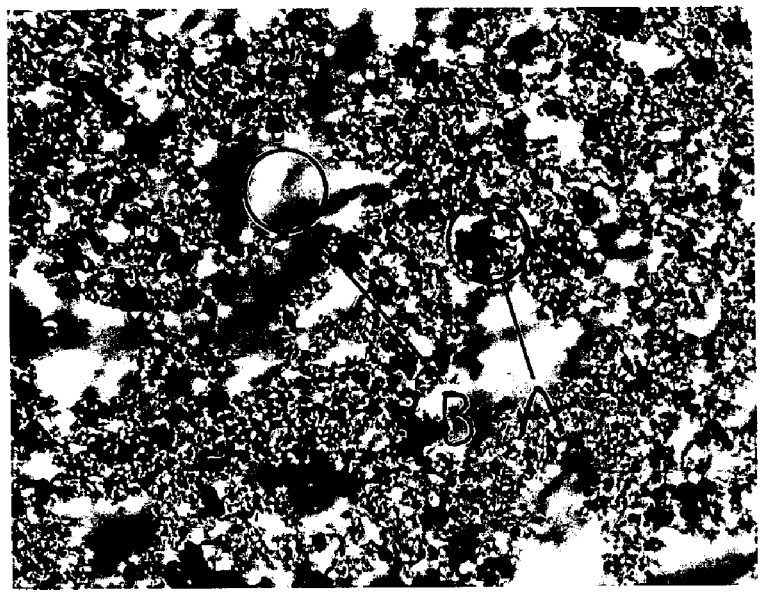
FIG. 3 is a 200× magnification micrograph showing the surface of amorphous low melting glass using a sealing material of $SiO_2$ fine particles added to $P_2O_5$—SnO type low melting glass powder and 3.0 wt % of ethyl cellulose of the present invention.
Figure 4:
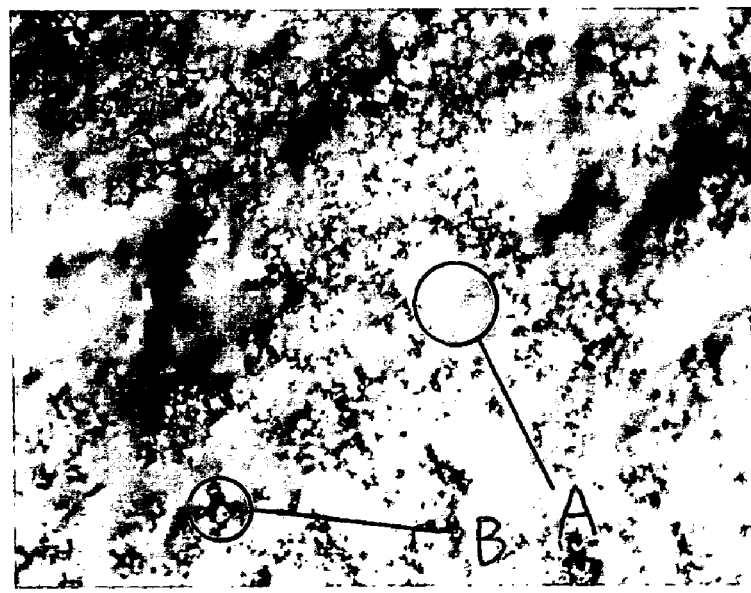
FIG. 4 is a 200× magnification micrograph showing the surface of amorphous low melting glass using a sealing material comprising a main component of $P_2O_5$—SnO type low melting glass powder, 3.0 wt % of ethyl cellulose and $SiO_2$ fine particles of the present invention.

Referring now to FIGS. 1–8, a sealing material for sealing an envelope of an electron tube, a method of preparing the sealing material for sealing an envelope of an electron tube, as well as, an electron tube having an envelope sealed with the sealing material of the present invention will be described in more detail. According to the sealing material of the present invention, the instability with devitrification of $P_2O_5$—SnO type low melting glass powder on the surface of sealing area is improved by adding insulating oxide fine particles to $P_2O_5$—SnO type low melting glass powder so as to strengthen the sealing strength. It is noted that the instability with devitrification of $P_2O_5$—SnO type low melting glass powder on the surface of sealing area can be significantly improved by the use of additives having a particle diameter of 0.1 μm or less, such as $SiO_2$, $Al_2O_3$ and $ZrO_2$, as well as the sealing strength can be effectively improved.

An example of the present invention using $SiO_2$ which is relatively easily available as an insulating oxide fine particles will be described. According to the present invention, the following results are obtained by the use of the insulating oxide fine particles for the sealing material.

(A) $SiO_2$ as insulating oxide fine particles are uniformly attached to the surface of the $P_2O_5$—SnO type low melting glass powder.

(B) $SiO_2$ fine particles uniformly attached to the surface of the $P_2O_5$—SnO type low melting glass powder significantly decreases the direct contact of the $P_2O_5$—SnO type low melting glass powder to organic vehicle and organic solvent.

(C) By the protecting action of the $SiO_2$ fine particles, $P_2O_5$ and SnO are reduced in the $P_2O_5$ and SnO type low melting glass powder, thereby preventing $P_2O_5$ and SnO from vaporization.

(D) Devitrification on the surface resulted from vaporization of $P_2O_5$ and SnO can be effectively suppressed.

More specifically, since the surface of the $P_2O_5$—SnO type low melting glass powder is coated with $SiO_2$ fine particles, the chance of direct contact of the $P_2O_5$—SnO type low melting glass powder with organic substances, such as, an organic solvent and a vehicle can be sufficiently decreased when burning the organic substances at the step of baking the paste-like sealing material. Subsequently, $P_2O_5$ and SnO are reduced in the low melting glass powder, thereby decreasing the occurrence of devitrification on the surface which makes molten glass unstable.

The effect by addition of the $SiO_2$ fine particles will be discussed hereinafter. The $SiO_2$ fine particles acts as an inorganic binder to improve the thixotropy of the paste-like sealing material. Accordingly, when the paste-like sealing material using $P_2O_5$—SnO type low melting glass powder is produced, it is possible to decrease the amount of addition of an organic binder, such as, ethyl cellulose, nitrocellulose and the like. As a result, the occurrence of the devitrification on the surface can be suppressed by virtue of the action of the decrease in the amount of addition of the organic binder.

In addition, when the paste-like sealing material is applied on the surface of the substrate of the vacuum fluorescent display by means of a screen printing method, the fluidity of the paste-like sealing material can be improved by virtue of the addition of the $SiO_2$ fine particles at the time of passing the paste-like sealing material through the stainless steel-made mesh on the surface of screen printing plate by a squeegee. Therefore, the seal pattern formed by the paste-like sealing material transferred after it has been passed through the stainless steel-made mesh is easy to be fixed.

After the $SiO_2$ fine particles are distributed substantially uniformly in the vehicle, each of the $P_2O_5$—SnO type low melting glass powder and thermal expansion-controlling ceramics is put into the vehicle, thereby, the aggregation of the $SiO_2$ can be hindered. As a result, the $SiO_2$ fine particles can adhere substantially uniformly on the surfaces of both of the $P_2O_5$—SnO type low melting glass powder and the thermal expansion-controlling ceramics. By addition of the $SiO_2$ fine particles and adhesion of the $SiO_2$ fine particles to the surfaces of both the $P_2O_5$—SnO type low melting glass powder and the thermal expansion-controlling ceramics, the $SiO_2$ fine particles act as an inorganic binder, and the thixotropy of the paste like sealing material can be improved. Thus, it is possible to decrease the amount of an organic binder, such as ethyl cellulose, nitrocellulose, and the like, added to the paste-like sealing material using the $P_2O_5$—SnO type low melting glass powder.

The present invention will be explained in detail by way of the following examples:

EXAMPLE 1

A sealing material using $P_2O_5$—SnO type low melting glass powder is prepared as follows:

A vehicle prepared by mixing 0.5~5.0 wt % of resin, such as ethyl cellulose, nitrocellulose and the like, with a solvent having a high boiling point, such as; butyl carbitol (trade name for UCC), butyl carbitol acetate (trade name for UCC), terpineol, hexanol, and methanol, is used. A solvent having high decomposition and high viscosity is preferable as a solvent having a high boiling point.

First, the vehicle is put into a container. The vehicle is sufficiently agitated and kneaded by rotating the container at high speed of 1000/min. $SiO_2$ fine particles are added into the vehicle which is agitated by high speed rotation to knead the $SiO_2$ fine particles with the vehicle so that the $SiO_2$ fine particles are distributed substantially uniformly into the vehicle. Next, $P_2O_5$—SnO type low melting glass powder and thermal expansion-controlling ceramics having low expansion coefficient are mixed with 10~30 wt % of vehicle on the total weight of the $P_2O_5$—SnO type low melting glass powder and the thermal expansion-controlling ceramics having low expansion coefficient, and agitated and mixed by high rotation at 000/min to obtain a paste-like sealing material of Example 1.

In Example 1, $SiO_2$ fine particles having a particle diameter of 0.1 μm and below are used. It is, however, preferable to use $SiO_2$ having a particle diameter of 0.05 μm and below and specific surface of 50~400 $m^2/g$ such as ultrafine $SiO_2$ manufactured by Nihon Aerosil Co. Ltd. In Example 1, a mixture of $P_2O_5$—SnO type low melting glass powder and 5~40 wt % of thermal expansion-controlling ceramics on the weight of the low melting glass powder, and 0.001~2.0 wt %, preferably 0.1~1.0 wt % of $SiO_2$ on the weight of the mixture of the powder and the ceramics are used. On the other hand, the thermal expansion-controlling ceramics having low expansion coefficient and containing no substance having adverse effect on environment, such as cocinerite, zirconium, silica, zirconium oxyphosphate, aluminum titanate and the like, can be used.

The paste-like sealing material of Example 1 is applied on the surface of the glass substrate 2 of a vacuum fluorescent display, as an example of an electron tube, by a screen printing method to form a seal pattern 8. Subsequently, control and cathode electrodes are mounted on the anode substrate to form the envelope to be sealed. Then, the envelope is heated to 400~500° C. which is maintained for a predetermined period. Then, the organic solvent in the paste-like sealing material is evaporated and the vehicle decomposes to be evaporated. Simultaneously, the frit glass powder is melted to form monolithic amorphous low melting glass to effect the sealing between the glass substrate 2 and the spacer glass plates 5 to form the vacuum fluorescent display 1.

Next, the amount of addition of $SiO_2$ fine particles (insulating oxide fine particles) and optimal values of composition ratio of the $SiO_2$, glass powder and vehicle will be discussed. In the experiment, $P_2O_5$—SnO type low melting glass powder is referred to as "component X". A mixture of $P_2O_5$—SnO type low melting glass powder and 5~40 wt % of thermal expansion-controlling ceramics on the weight of the former is referred to as "component Y." Each of $SiO_2$ having a particle diameter of 0.001, 0.01, 0.03, 0.1 and 1.0 μm was mixed with a vehicle prepared by dissolving about 1 wt % of ethyl cellulose into butyl carbitol (trade name for UCC) having a high boiling point to form mixtures. In this case, the addition of the amount of the $SiO_2$ was changed in 0, 0.01, 0.10, 0.50, 1, 2 and 5 wt % to the total weigh of component X and component Y. Each of the mixtures thus obtained was used as a seal paste-like sealing material.

Figure 7:
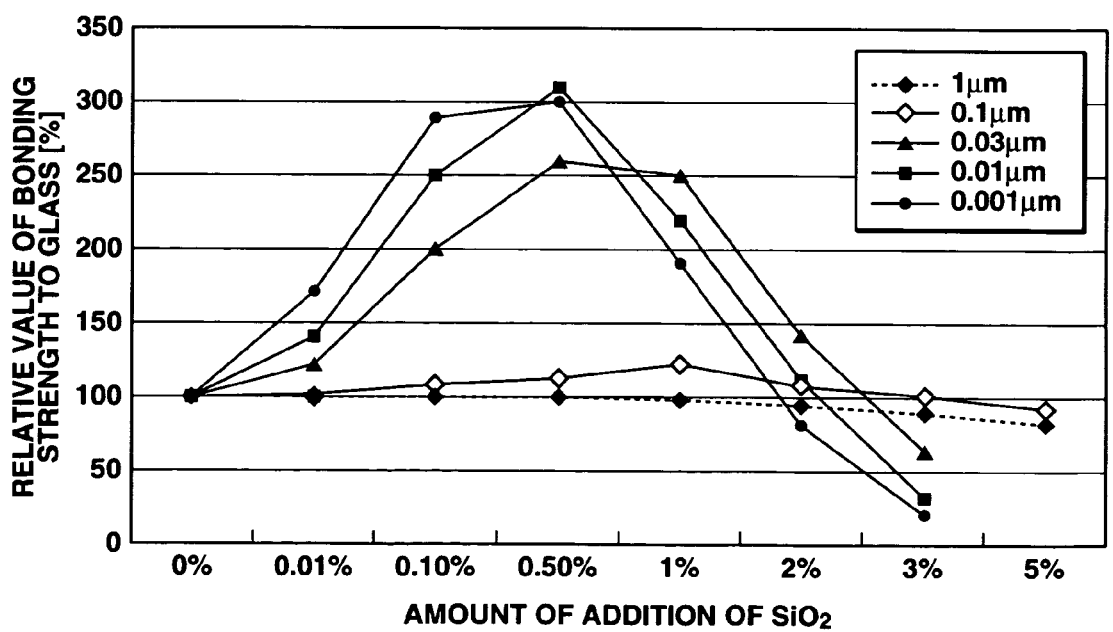
FIG. 7 is a graph showing sealing strength of the sealing materials in which the diameters of PbO—$B_2O_3$—$SiO_2$ type low melting glass and $P_2O_5$—SnO type low melting glass and amount of addition of fine particles are changed.
Figure 8:
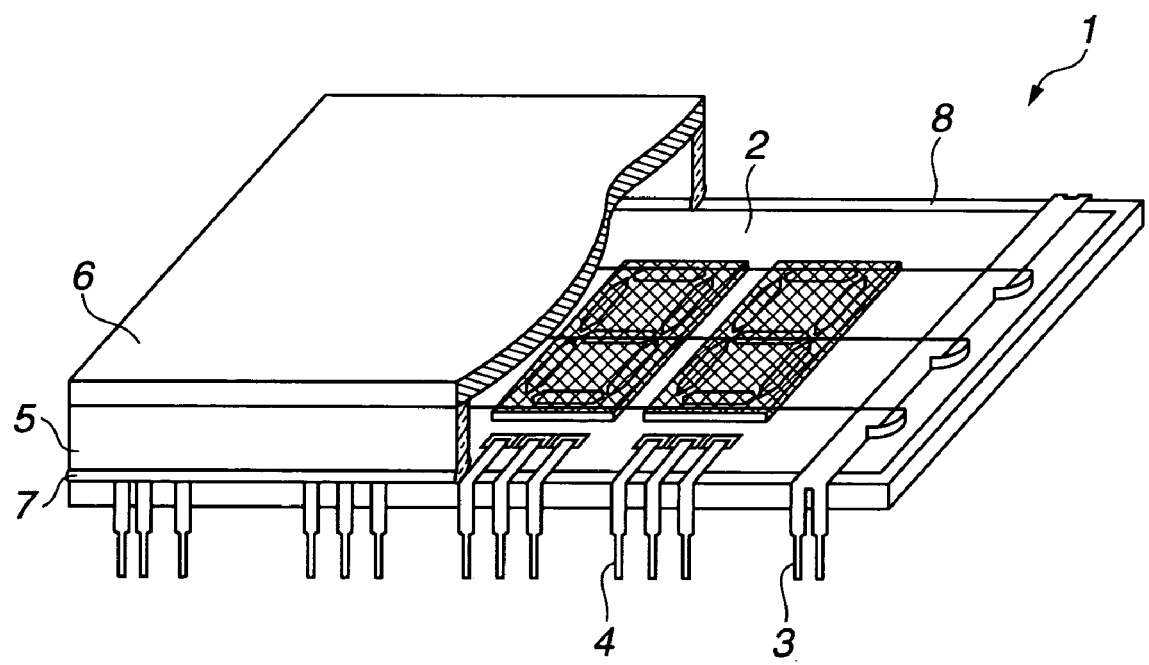
FIG. 8 is a partial sectional view of a vacuum fluorescent display as an example of an electron tube.

The sealing strength of amorphous low melting glass was measured by using each of the sealing materials for sealing the glass substrate 2 with the spacer glass plates 5 of the vacuum fluorescent display 1. The sealing strength of the amorphous low melting glass was measured as follows: The seal paste 8 was applied in a predetermined pattern on the glass substrate 2 which was then baked, and then passed through a sealing furnace so that the amorphous-vitrifying seal paste is formed in the predetermined pattern or a sample of glass plate 3.5 mm in wide, 10 mm in length and 20 mm in height joined using the seal paste 8. Then, the sealing strength of the amorphous-vitrified sealing material at the joining area (bonding area) was measured by the use of a push-pull gauge. The results of measurements are shown in FIG. 7.

For comparison with Example 1, a paste-like sealing material prepared by mixing PbO—$B_2O_3$—$SiO_2$ type low melting glass powder as a low meting glass powder with 0.5 wt % ethyl cellulose was evaluated in the same manner as the sealing material described above. As a result, it was confirmed that when the particle diameter of the $SiO_2$ fine particle is 0.0 μm and below, the sealing strength increases remarkably.

The results shown in FIG. 7 suggest that the $SiO_2$ fine particles having a particle diameter of 0.01 μm and below can increase the sealing strength, even if the amount of addition thereof is small. When the amount of addition of $SiO_2$ is 0.01~2.0 wt %, the sealing strength increases, and the sealing strength further increases, when the amount of addition of $SiO_2$ is 0.1~1.0 wt %.

Next, a paste-like sealing material prepared by mixing $P_2O_5$—SnO type low melting glass powder and PbO—$B_2O_3$—$SiO_2$ type low melting glass powder as a low melting glass powder, and 0.5 wt % of ethyl cellulose was evaluated in the same manner as the sealing material described above. As a result, it was confirmed that when the particle diameter of the $SiO_2$ fine particle is 0.01 μm and below, the sealing strength increases remarkably. Since the $SiO_2$ fine particles act as an inorganic binder, the thixotropy of the paste-like sealing material can be increased. Accordingly, the sealing material using $P_2O_5$—SnO type low melting glass powder can decrease the amount of addition of the organic binder, such as ethyl cellulose, nitro cellulose and the like.

In order to confirm that the devitrification on the surface of the sealing material can be decreased by adding the $SiO_2$ fine particles to a mixture of low melting glass powder and thermal expansion-controlling ceramics having a low expansion coefficient, a vacuum fluorescent display using a conventional paste-like sealing material prepared by mixing vehicle containing ethyl cellulose as an organic solvent with $SiO_2$ fine particles was prepared, and the sealing strength was measured. In this case, the amount of addition of the vehicle was decreased.

Figure 6:
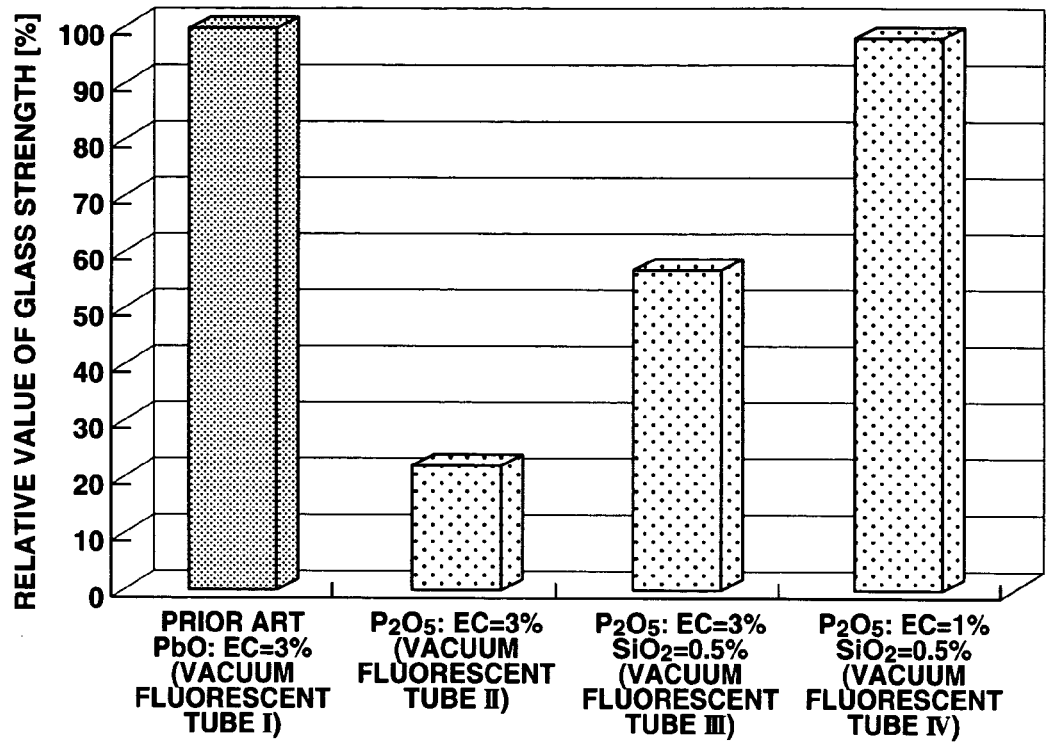
FIG. 6 is a graph showing sealing strength of the sealing materials shown in FIGS. 1–4.

More specifically, a vacuum fluorescent display I, a vacuum fluorescent display II, a vacuum fluorescent display III and a vacuum fluorescent display IV were prepared in which different paste-like sealing materials are used, respectively. The sealing strength of the sealing material was measured in the same manner as the sealing material described above. The seal paste 8 was formed in a predetermined pattern which was then baked, and passed through a sealing furnace to form the amorphous-vitrifying seal paste of the predetermined pattern sample of glass plate 3.5 mm in wide, 10 mm in length and 20 mm in height joined using the seal paste 8. Then, the sealing strength of the amorphous-vitrified sealing material at a joining area (bonding area) was measured by the use of a push-pull gauge. The results of measurements are shown in FIG. 6.

Vacuum Fluorescent Display I

As a comparative example, the vacuum fluorescent display I was prepared using a conventional paste-like sealing material comprising, as main components, the PbO—$B_2O_3$—$SiO_2$ type low melting glass powder and ethyl cellulose as an organic solvent. The sealing strengths of the vacuum fluorescent display II, vacuum fluorescent display III and vacuum fluorescent display IV were relatively evaluated, taking the sealing strength of the vacuum fluorescent display I as 100%.

Vacuum Fluorescent Display II

The vacuum fluorescent display II was prepared using the paste-like sealing material comprising, as main components, the $P_2O_5$—SnO type low melting glass powder, and 3.0 wt % of the ethyl cellulose as an organic solvent. The sealing strengths of the vacuum fluorescent display II was 20% and below relative to that of the vacuum fluorescent display I and therefore could not maintain the vacuum level required for the envelope of the vacuum fluorescent display.

Vacuum Fluorescent Display III

The vacuum fluorescent display III was prepare using the paste-like sealing material comprising, as main components, the $P_2O_5$—SnO-type low melting glass powder, 3.0 wt % of the ethyl cellulose as an organic solvent, and 0.5 wt % of $SiO_2$ fine particles having an average particle diameter of 0.1 μm added to the powder glass. The sealing strengths of the vacuum fluorescent display III was about 55% relative to that of the vacuum fluorescent display I and could maintain the vacuum level required for the envelope of the vacuum fluorescent display. It was, however, sufficient sealing strength with consideration of reliability.

Vacuum Fluorescent Display IV

The vacuum fluorescent display IV was prepared using the paste-like sealing material comprising, as main components, the $P_2O_5$—SnO type low melting glass powder, 1.0 wt % of the ethyl cellulose as an organic solvent, and 0.5 wt % of $SiO_2$ fine particles having an average particle diameter of 0.1 μm added to the powder glass. The sealing strengths of the vacuum fluorescent display IV was about 95% relative to that of the vacuum fluorescent display I and could maintain the vacuum level required for the envelope of the vacuum fluorescent display and had sufficient reliability.

In order to confirm the effect of the present invention, ×200 magnification micrographs of the states of the surfaces of the sealing materials of each of the vacuum fluorescent displays I, II, III, and IV were taken (each of micrographs shown in FIGS. 1~4), and the presence or absence of the devitrification on the surface of the sealing materials was examined.

Vacuum Fluorescent Display I

From the ×200 magnification micrograph of the surface of the sealing material used for sealing the vacuum fluorescent display I (reference should be made to micrograph of FIG.

1), it is confirmed that, while almost all of the surfaces of the sealing material are glass region (B), there is partially a devitrification region (A).

Vacuum Fluorescent Display II

From the ×200 magnification micrograph of the surface of the sealing material used for sealing the vacuum fluorescent display II (reference should be made to micrograph of FIG. 2), it is confirmed that about 90% of the surfaces of the sealing material are devitrification region (A).

Vacuum Fluorescent Display III

From the ×200 magnification micrograph of the surface of the sealing material used for sealing the vacuum fluorescent display III (reference should be made to micrograph of FIG. 3), it is confirmed that about 60% of the surfaces of the sealing material are glass region (B) and about 40% thereof are devitrification region (A).

Vacuum Fluorescent Display IV

From the ×200 magnification micrograph of the surface of the sealing material used for sealing the vacuum fluorescent display IV (reference should be made to micrograph of FIG. 4), it is confirmed that about 90% and above of the surfaces of the sealing material are glass region (B) and about 5% thereof are devitrification region (A).

From each of the results, it can be asserted that the state of the surface of the sealing material of the present invention used in the vacuum fluorescent display IV closely resembles the state of the surface when using the conventional paste-like sealing material comprising, as main components, $P_2O_5$—SnO type low melting glass powder and 3.0 wt % of ethyl cellulose as an organic solvent and therefore has no problem practically. Then, the surface of the sealing material of the present invention used for sealing the vacuum fluorescent display IV was analyzed. The result obtained is shown in FIG. 5.

Figure 5:
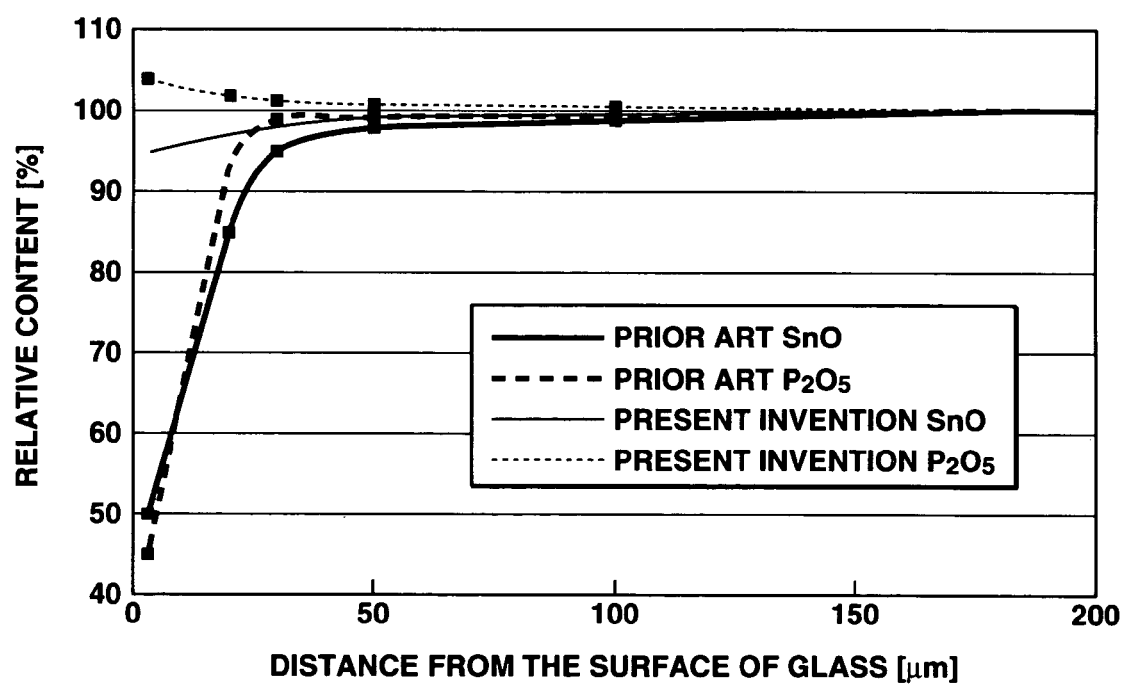
FIG. 5 is a graph showing the surface shown in FIG. 2.

From a graph shown in FIG. 5, it can be understood that SnO component (illustrated by a fine line) making contribution to low melting point decreases by 5%, while $P_2O_5$ component (illustrated by a dotted fine line) constituting a network structure of glass increases by about 5% on the surface of the amorphous low melting glass constituting the sealing material of the present invention. Accordingly, the sealing material of the present invention can act as a material for constituting a hermetically sealed envelope having sufficient sealing strength without occurrence of devitrification.

EXAMPLE 2

By the sealing material using $Al_2O_3$ fine particles or $ZrO_2$ fine particles having an average particle diameter of 0.1 and below instead of $SiO_2$ fine particles having an average particle diameter of 0.1 μm as insulating oxide fine particles, effects similar to those obtained by $SiO_2$ fine particles having an average particle diameter of 0.1 μm and below were obtained.

In the foregoing embodiments, the present invention is described in connection with the vacuum fluorescent display inside of which is maintained in vacuum by sealing the glass substrate and the front cover by the sealing material comprising low melting glass powder as a main component, and treating at high temperatures to form amorphous glass. However, the sealing material of the present invention comprising as, main components, $P_2O_5$—SnO type low melting glass powder and thermal expansion-controlling ceramics having a low melting point can be applied to a plasma display panel or other devices constituted in a hermetically sealed glass container.

According to the present invention, by adding insulating oxide fine particles having a particle diameter of 0.01~0.1 μm to a mixture of $P_2O_5$—SnO type low melting glass powder and thermal expansion-controlling ceramics having a low expansion coefficient as main components of a sealing material and ethyl cellulose, if necessary, it is possible to obtain the sealing material without lead having adverse effect on environment which can inhibit the occurrence of devitrification and can ensure sufficient sealing strength.

Obviously, many modifications and variations of the present invention are possible in the light of the above teachings. It is therefore to be understood that within the scope of the appended claims, the invention may be practiced otherwise than as specifically described.

What is claimed is:

1. A sealing material for sealing an envelope of an electron tube comprising:

$P_2O_5$—SnO low melting glass powder having a softening point of approximately 300° C. to 400° C.;

thermal expansion-controlling ceramics having low expansion coefficient; and insulating oxide fine particles having a particle diameter of approximately 0.001 to approximately 0.1 μm, wherein the insulating oxide fine particles are substantially uniformly distributed on the surface of the $P_2O_5$—SnO low melting glass powder.

2. The sealing material for sealing an envelope of the electron tube as in claim 1, wherein the insulating oxide fine particles are present in approximately 0.01 to approximately 2 wt % to the total weight of the $P_2O_5$—SnO be low melting glass powder and the thermal expansion-controlling ceramics.

3. The sealing material for sealing an envelope of the electron tube as in claim 1, wherein the insulating oxide fine particles are selected from the group consisting of $SiO_2$, $Al_2O_3$ and $ZrO_2$.

* * * * *

UNITED STATES PATENT AND TRADEMARK OFFICE
CERTIFICATE OF CORRECTION

| | |
|---|---|
| PATENT NO. | : 7,214,429 B2 |
| APPLICATION NO. | : 10/673939 |
| DATED | : May 8, 2007 |
| INVENTOR(S) | : Kato et al. |

It is certified that error appears in the above-identified patent and that said Letters Patent is hereby corrected as shown below:

Column 6, Line 33, "at 000/min" should be changed to -- at 1000/min --

Column 10, Line 45, Claim 2, "be low melting" should be changed to -- low melting --

Signed and Sealed this

Fourteenth Day of August, 2007

JON W. DUDAS
*Director of the United States Patent and Trademark Office*